United States Patent [19]

Watanabe et al.

[11] Patent Number: 4,492,989
[45] Date of Patent: Jan. 8, 1985

[54] TIME BASE CORRECTING APPARATUS

[75] Inventors: Nobuhiko Watanabe; Masato Tanaka, both of Tokyo, Japan

[73] Assignee: Sony Corporation, Tokyo, Japan

[21] Appl. No.: 465,462

[22] Filed: Feb. 10, 1983

[30] Foreign Application Priority Data

Feb. 15, 1982 [JP] Japan .................. 57-22290

[51] Int. Cl.³ .............................................. G11B 5/00
[52] U.S. Cl. ................................................. 360/32
[58] Field of Search ....................... 360/32, 15, 13, 39

[56] References Cited

U.S. PATENT DOCUMENTS 4,398,224 8/1983 Watanabe ........................... 358/339

Primary Examiner—Vincent P. Canney
Attorney, Agent, or Firm—Lewis H. Eslinger; Alvin Sinderbrand

[57] ABSTRACT

A time base correcting apparatus is disclosed which is capable of correcting time base errors contained in a digital signal supplied thereto in the form of successive data blocks with each data block including plural data words. Each data block includes therein at least plural data words and a block address circulating with a predetermined phase relation relative to a certain reference signal. A memory is provided, having plural addressable storage locations, each adapted to store a respective data block. A write-in address to identify the particular storage locations is generated according to data block addresses and read-out addresses. The write-in address is varied by a lock phase mode signal indicative of a phase relation at which an incoming digital signal is locked to a reference signal so that notwithstanding the phase mode in which the digital signal is locked to the reference signal, the correction ability of the time base correcting apparatus can be prevented from being lowered.

5 Claims, 29 Drawing Figures

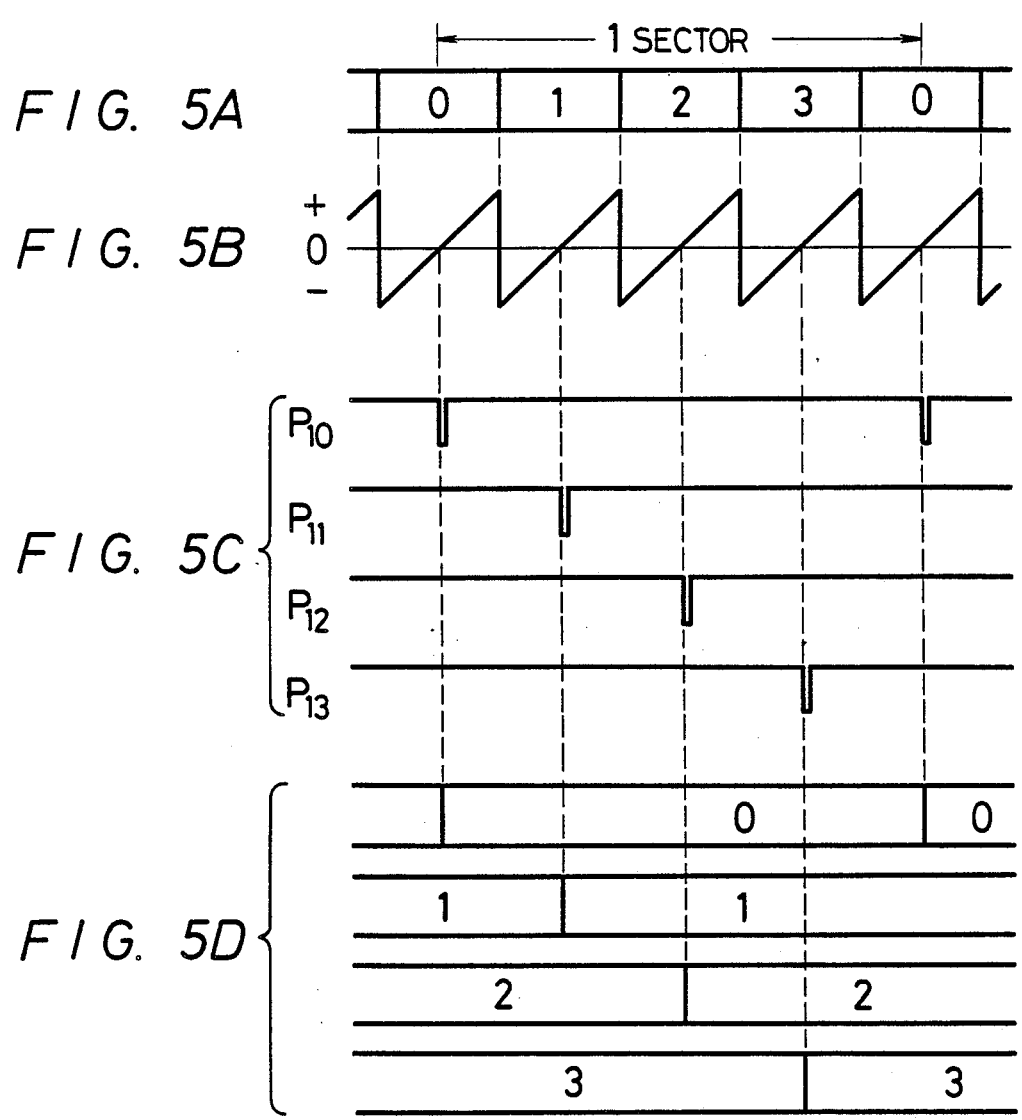

FIG. 6A (0 MODE)

| RA \ BA | [0] | [1] | [2] | [3] |
|---|---|---|---|---|
| 0 | 4 | 5 | 2 | 3 |
| 1 | 4 | 5 | 6 | 3 |
| 2 | 4 | 5 | 6 | 7 |
| 3 | 0 | 5 | 6 | 7 |
| 4 | 0 | 1 | 6 | 7 |
| 5 | 0 | 1 | 2 | 7 |
| 6 | 0 | 1 | 2 | 3 |
| 7 | 4 | 1 | 2 | 3 |

FIG. 6B (1 MODE)

| RA \ BA | [0] | [1] | [2] | [3] |
|---|---|---|---|---|
| 0 | 5 | 2 | 3 | 4 |
| 1 | 5 | 6 | 3 | 4 |
| 2 | 5 | 6 | 7 | 4 |
| 3 | 5 | 6 | 7 | 0 |
| 4 | 1 | 6 | 7 | 0 |
| 5 | 1 | 2 | 7 | 0 |
| 6 | 1 | 2 | 3 | 0 |
| 7 | 1 | 2 | 3 | 4 |

FIG. 6C (2 MODE)

| RA \ BA | [0] | [1] | [2] | [3] |
|---|---|---|---|---|
| 0 | 2 | 3 | 4 | 5 |
| 1 | 6 | 3 | 4 | 5 |
| 2 | 6 | 7 | 4 | 5 |
| 3 | 6 | 7 | 0 | 5 |
| 4 | 6 | 7 | 0 | 1 |
| 5 | 2 | 7 | 0 | 1 |
| 6 | 2 | 3 | 0 | 1 |
| 7 | 2 | 3 | 4 | 1 |

FIG. 6D (3 MODE)

| RA \ BA | [0] | [1] | [2] | [3] |
|---|---|---|---|---|
| 0 | 3 | 4 | 5 | 2 |
| 1 | 3 | 4 | 5 | 6 |
| 2 | 7 | 4 | 5 | 6 |
| 3 | 7 | 0 | 5 | 6 |
| 4 | 7 | 0 | 1 | 6 |
| 5 | 7 | 0 | 1 | 2 |
| 6 | 3 | 0 | 1 | 2 |
| 7 | 3 | 4 | 1 | 2 |

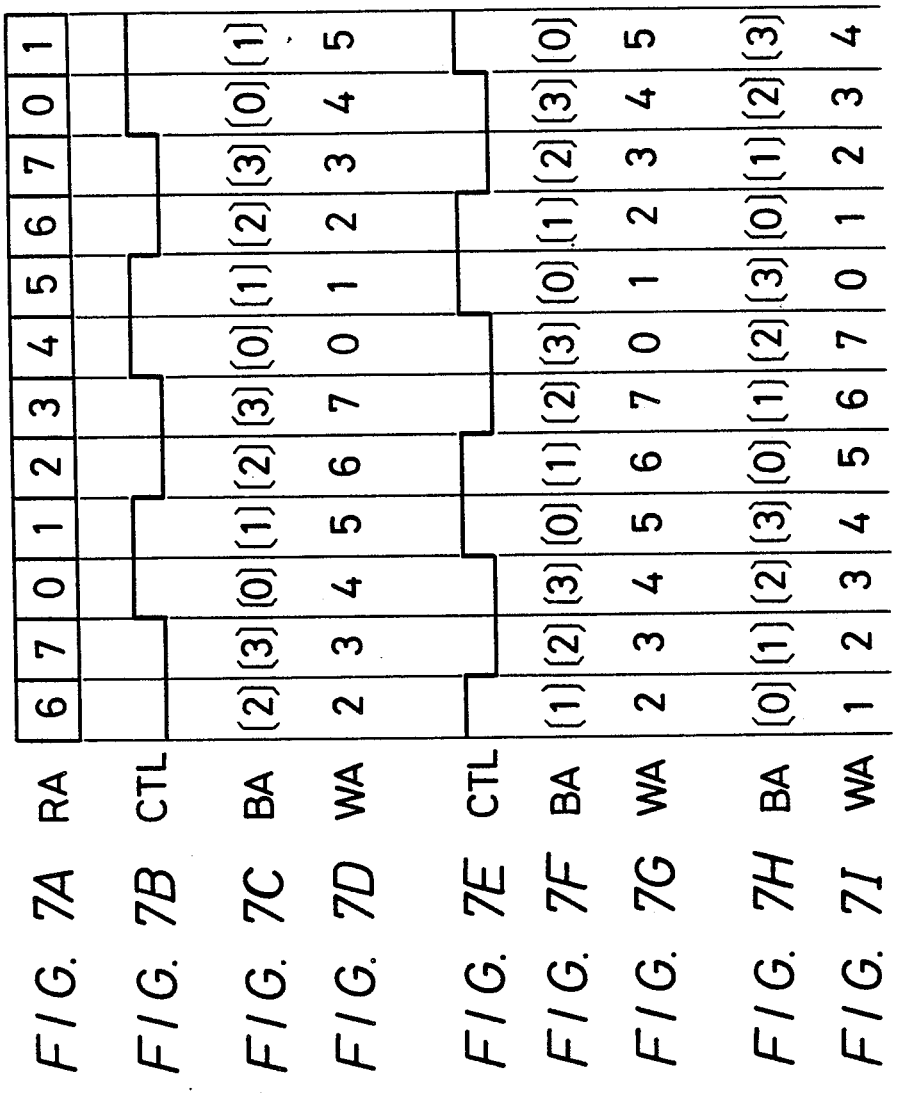

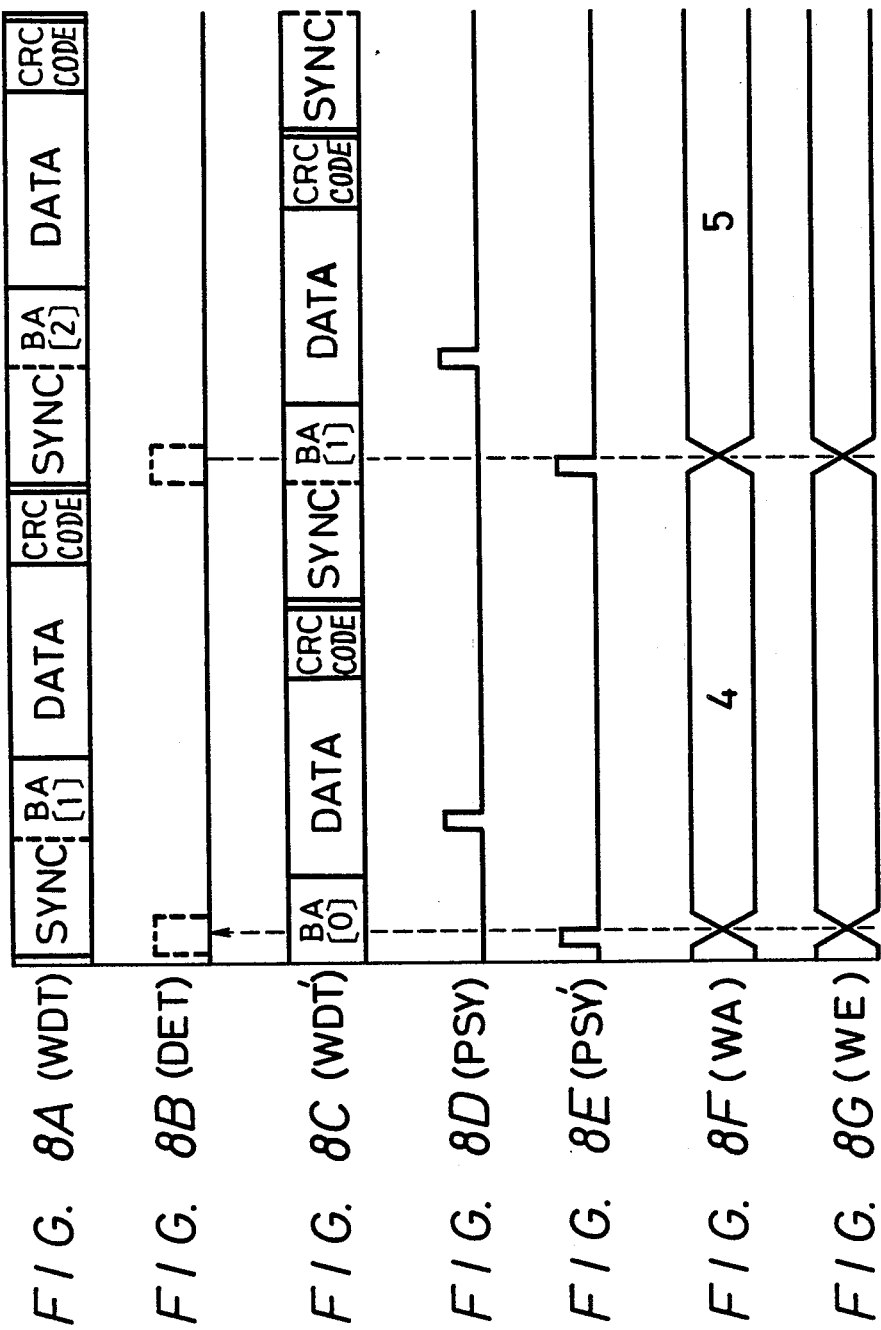

TIME BASE CORRECTING APPARATUS

BACKGROUND OF THE INVENTION

1. Field of the Invention

This invention generally relates to a time base correcting apparatus and more particularly relates to a time base correcting apparatus capable of correction of time base errors or variations contained in a digital signal which is formed of successive data blocks.

2. Description of the Prior Art

It is known that, when a signal such as a video signal, an audio signal and so on is modulated or converted into a pulse code modulation (PCM) signal to be recorded and reproduced, a time base correcting apparatus or corrector (hereinafter, simply referred to as TBC) is used in the playback side. The essential function of the TBC is to remove time base errors or variations contained in a reproduced data. To this end, the reproduced data is written in a memory by a clock pulse in synchronism therewith and then read-out therefrom by a reference clock pulse. When recording and reproducing the audio PCM signal and so on, an error correctable encoding is carried out, PCM data of plural words and error detection (or correction) codes are used to constitute one block and a synchronizing signal is added to each block so that the data of each block is written in the memory of TBC at its predetermined address. Since the output data from the TBC is supplied to an error correction decoder, a digital-to-analog (D/A) converter and so on, thereby error correction, D/A conversion and so on being conducted. For the purpose of performing these processings correctly, time series of the output data from the TBC must be coincident with that of the reproduced data.

By the way, the conventional TBC is provided, forming the write-in address on the basis of the synchronizing signal separated from the reproduced data. Since the synchronizing signal contained in the reproduced data is affected by a dropout, a noise and so on, the control of the write-in address based on such synchronizing signal is not made stable and hence the data of one block is written at the wrong block address with a result that the time series of data read out from the memory becomes different from that of the reproduced data. Particularly when an interleave technique is used to cope with burst errors due to dropout, the time series of the reproduced data must strictly be coincident with that upon recording. When the synchronizing signal is separated from the reproduced data, in the conventional TBC, it is proposed to eliminate the influences of dropout and noise and then to derive only the correct synchronizing signal, too. But, this is not satisfactory.

Therefore, we, the same assignee of this application, have previously proposed a time base correcting apparatus capable of performing the correct control of the write-in address by adding the block address to every blocks and writing the data of each block in the address of the TBC corresponding to this block address, which apparatus is disclosed in the U.S. patent application Ser. No. 06/298,522, filed Sept. 1, 1981.

By the way, in a tape recorder to which the TBC is applied, discontinuity is caused in a phase of a servo control signal recorded on a magnetic tape due to splice-edition and so on. Thus, a phase-locked loop (PLL) servo, by which upon playback the running of the magnetic tape is phase-locked to the reference signal, is made unstable by this discontinuity giving rise to a problem that it takes a long settling time for the magnetic tape to be phase-locked to the reference signal. In order to solve such problem or defect, there is employed a servo circuit in which a polyphase, for example, four-phase signal is used or a reference signal so as to enable the transportation of the magnetic tape to be phase-locked to any one phase of the four-phase reference signal. When this polyphase servo circuit is employed, there exist plural phase relations between the reference signal and the reproduced data. Since the read-out address of the aforenoted TBC is formed from the reference signal, depending on the phase relation of the incoming data, a phenomenon as if the time base errors are increased may take place with the result that the correction ability of the TBC will be sometimes lowered substantially.

OBJECTS AND SUMMARY OF THE INVENTION

Accordingly, it is an object of this invention to provide an improved time base correcting apparatus which can obviate the aforenoted prior art defects.

It is another object of this invention to provide a time base correcting apparatus in which a block address of input data is added to a read-out address and a lock-phase mode information representing a phase relation of the input data to the reference signal is employed to generate the write-in address for the memory of a time base corrector.

In accordance with an aspect of this invention, there is provided a time base correcting apparatus capable of correcting time base errors contained in a digital signal supplied thereto in the form of successive data blocks with each data block including plural data words. Each data block includes therein at least plural data words and a block address circulating with a predetermined phase relation relative to a certain reference signal. A memory is provided, having plural addressable storage locations, each adapted to store a respective data block. Write-in addresses to identify the particular storage locations are generated according to data block addresses and read-out addresses. The write-in address is varied by a lock phase mode signal indicative of a phase relation at which an incoming digital signal is locked to a reference signal so that notwithstanding the phase mode in which the digital signal is locked to the reference signal, the correction ability of the time base correcting apparatus can be prevented from being lowered.

The other objects, features and advantages of the present invention will become apparent from the following description taken in conjunction with the accompanying drawings through which the like references designate the same elements and parts.

BRIEF DESCRIPTION OF THE DRAWINGS

The following detailed description, given by way of example, will best be understood in conjunction with the following drawings in which:

FIGS. 5A–5D are respectively timing diagrams each used to explain a polyphase servo circuit used in one embodiment of the time base correcting apparatus according to this invention;

FIGS. 6A–6D are respectively schematic diagrams showing tables for a read-only memory (ROM) for generating write-in block addresses used in one embodiment of this invention; and FIGS. 7A–7I and FIGS. 8A–8G are respectively timing diagrams each used to explain one embodiment of this invention.

DETAILED DESCRIPTION OF THE PREFERRED EMBODIMENT

Figure 1:
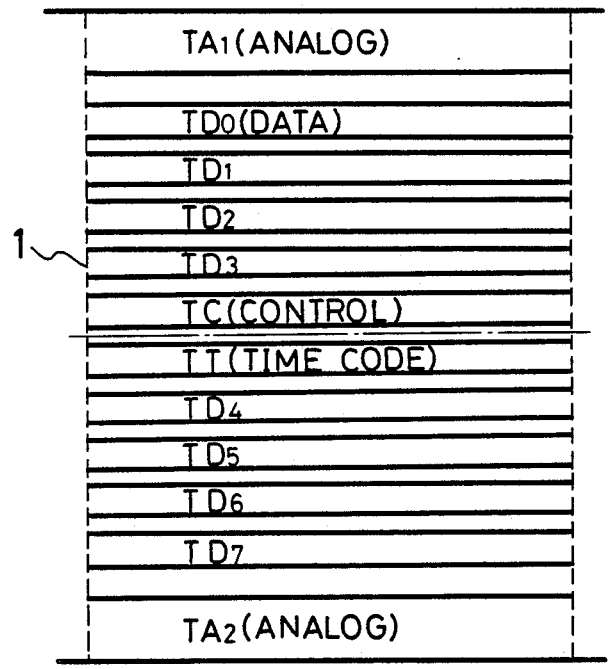
FIG. 1 is a schematic diagram representing one example of track patterns from which data is reproduced and supplied to a time base correcting apparatus of the present invention.
Figure 2A:
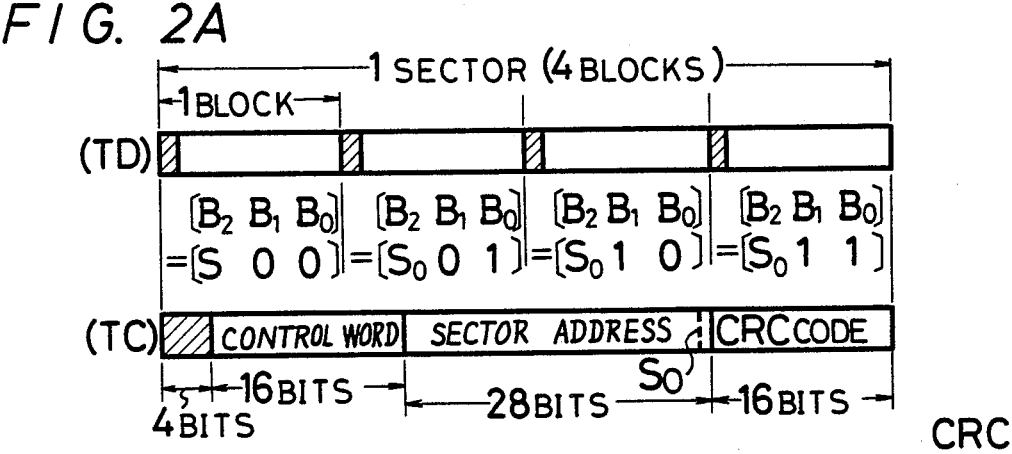
FIGS. 2A and 2B are timing diagrams representing various signals that are recorded as data and control tracks of a record medium with which the present invention is used.
Figure 2B:
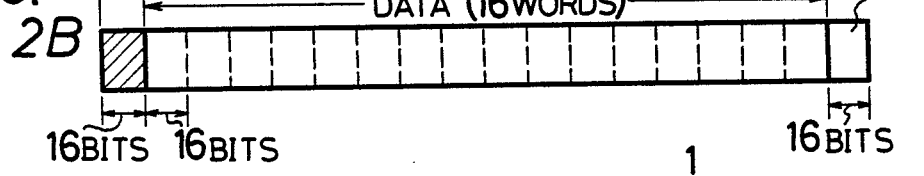

With reference to the drawings, one embodiment of this invention being applied to a fixed head or transducer type PCM tape recorder will be described. As shown in FIG. 1, in this case, on a magnetic tape 1 of ¼-inch width are formed 8 data tracks $TD_0$ to $TD_7$, 2 analog tracks $TA_1$ and $TA_2$, a control track TC and a time code track TT, respectively. On 8 data tracks $TD_0$ to $TD_7$ are recorded respective audio PCM signals of totally 8 channels, each being encoded as is determined before. As illustrated in FIG. 2A, the data tracks TD($TD_0$ to $TD_7$) and the control track TC are coincident with each other at their recording positions for each sector in the width direction. One sector of each of the data tracks TD includes data of 4 blocks. As shown in FIG. 2B, one transmission block (simply, referred to as one block) is formed of data of 16 words, each word being formed of 16 bits, a data synchronizing signal (shown by the hatched area in FIG. 2B) added to the beginning of the data and a cyclic redundancy check (CRC) code added to its end. A block address signal of 3 bits is inserted into the interval of the data synchronizing signal, and the block address signal and the data will both be detected for error by the CRC code. One sector of the control track TC is comprised of a synchronizing signal of 4 bits (shown by the hatched interval in FIG. 2A), a control word of 16 bits, a sector address signal of 28 bits and a CRC code of 16 bits. The control word of 16 bits is used to identify the sampling frequency of the PCM audio signal to be recorded and the recording format and the sector address is the absolute address incrementing from 0 address, both of which will be detected for error by the CRC code. As a modulation method for recording the audio PCM signal on the data tracks TD, there is employed a modulation system of high density recording, while an FM-modulation system or the like is employed to record a control signal on the control track TC. A least significant bit $S_0$ of the sector address signal is adapted to be coincident with a most significant bit of each block address signal of 4 blocks. That is, the block address $[B_2 B_1 B_0]$ sequentially changes so as to appear as $[S_0 0 0]$, $[S_0 0 1]$, $[S_0 1 0]$ and $[S_0 1 1]$ in that sector.

Figure 3:
FIG. 3 is a schematic diagram representing the arrangement of recording and playback transducers.

As shown in FIG. 3, there are provided magnetic heads or transducers as a recording transducer HR, a playback transducer HP and a recording transducer HR′ which are sequentially located in this order relative to the direction in which the magnetic tape 1 is transported. Each transducer has 10 recording or reproducing magnetic gaps each arranged in line along the width direction of the magnetic tape 1 of which 8 magnetic gaps correspond to the data tracks $TD_0$ to $TD_7$ and the rest two magnetic gaps correspond to the control track TC and the time code track TT, respectively. The first recording on the magnetic tape 1 is carried out by the recording transducer HR, and in the case of sync-recording and cut-in/-out, the recording transducer HR′ is employed. The control track TC once formed by the recording transducer HR is not rewritten but only the data tracks TD are rewritten.

Figure 4:
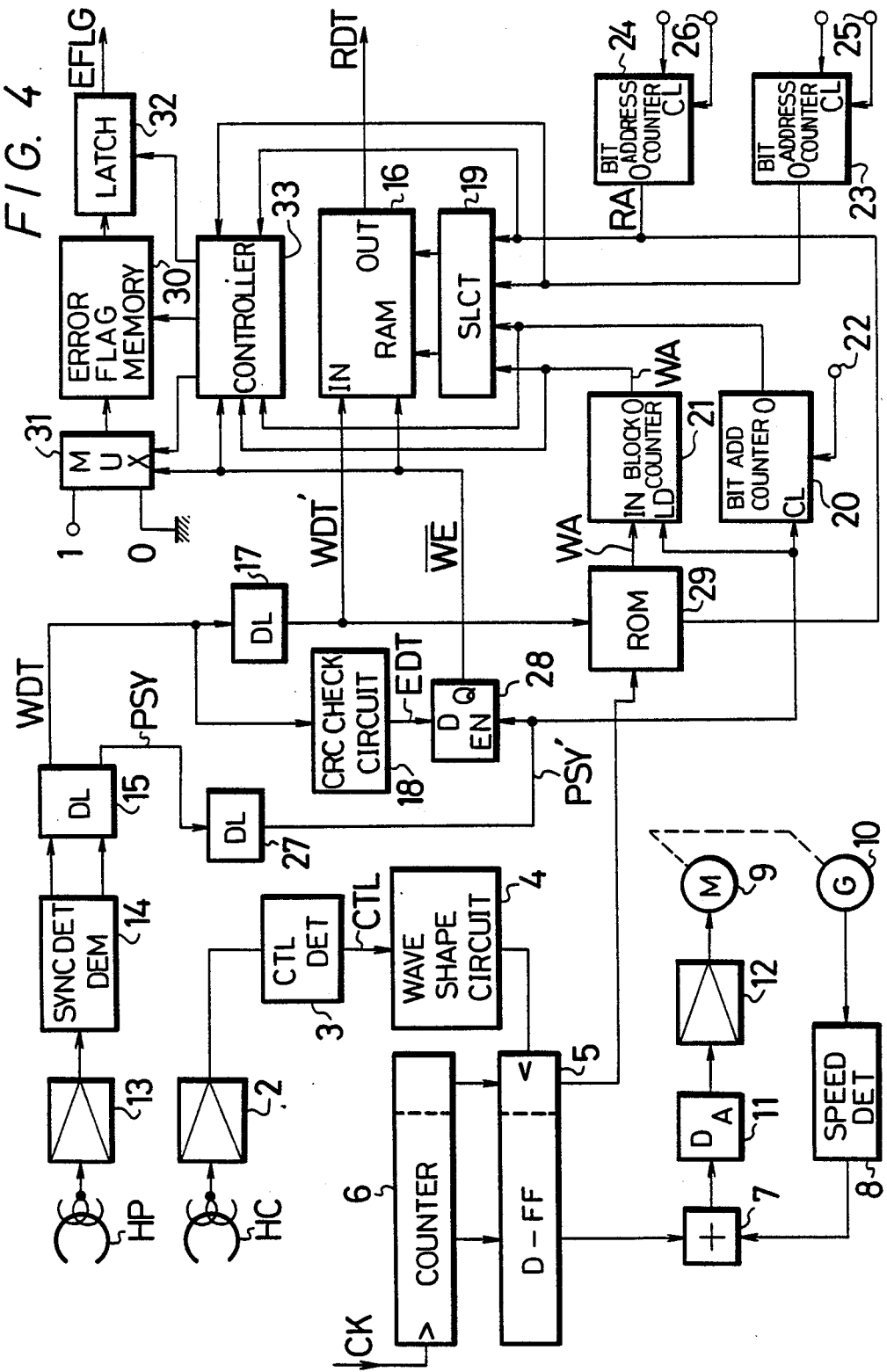
FIG. 4 is a schematic block diagram showing an example of the time base correcting apparatus according to this invention.

FIG. 4 schematically illustrates an arrangement of an example of the time base correcting apparatus according to the present invention in which a PCM signal is reproduced by the playback transducer HP from the data tracks TD and the control track TC is reproduced by a control transducer HC.

The output from the control transducer HC is supplied through a playback amplifier 2 to a CTL detection circuit 3 in which a CTL (control) signal is detected by detecting a synchronizing signal of each sector. This CTL signal is supplied to a waveform shape circuit 4 which then produces at its output a servo pulse. This servo pulse is supplied to a D-type flip-flop circuit 5 for phase comparison as its clock input.

Reference numeral 6 denotes a counter for counting a clock pulse CK of which plural bits except upper 2 bits are parallel-supplied to the D-type flip-flop circuit 5 as a reference signal. As illustrated in FIG. 5A, the upper 2 bits of the counter 6 repeatedly changes with the cycle corresponding to one sector so as to appear as 0, 1, 2 and 3, while as shown by a sawtooth wave in FIG. 5B, the lower bits thereof change their values stepwise at every clock pulses CK. The reference signal of which the value changes stepwise is formed on the basis of 2's complementary code and the value thereof is changed symmetrically around the center axis 0, which is repeated four times per one sector.

The D-type flip-flop circuit 5 is adapted to sample any one phase of the four-phase reference signal by the servo pulse, which then produces at its output a phase comparison output and a lock mode signal. The phase comparison output is supplied to an addition circuit or adder 7 and therein added with an output from a speed detection circuit 8. The detection of speed is carried out such that a signal with a frequency proportional to a revolution rate of a capstan motor 9 is generated by a tachogenerator 10 and the frequency of this signal is converted in the speed detection circuit 8 into the level thereof. The output from the adder 7 is converted by a digital-to-analog (D/A) converter 11 into an analog signal which is then supplied through a servo amplifier 12 to the capstan motor 9 made of a DC motor.

According to such servo circuit made so far, the magnetic tape 1 is transported at the predetermined speed with its phase locked to the reference signal. This phase-lock is performed for any one of 4-phase reference signal. In FIG. 5C, $P_{10}$, $P_{11}$, $P_{12}$ and $P_{13}$ respectively denote servo pulses in the state of being phase-locked to 0-th mode, first mode, second mode and third mode. Since in the D-type flip-flop circuit 5, the upper 2 bits of the counter 6 are sampled, the D-type flip-flop circuit 5 generates lock mode signals as shown in FIG. 5D in response to the servo pulse with its phase locked to the 0-th mode to the third mode.

The reproduced data (which is considered as data of one channel for simplicity) from the playback transducer HP is supplied through a playback amplifier 13 to a sync detection and demodulation circuit 14 from which a reproduced data and a block synchronizing signal are supplied to a delay circuit 15. This delay circuit 15 is provided to match the time bases between the reproduced signal through the circuit 14 and the lock mode signals generated from the aforementioned D-type flip-flop circuit 5. The reproduced data WDT and the reproduced synchronizing pulse PSY from this delay circuit 15 and the lock mode signals are supplied to the TBC.

In FIG. 4, numeral 16 denotes a memory or random-access memory (RAM) for the TBC. The reproduced data WDT is supplied to a delay circuit 17 and a CRC (cyclic redundancy check) checker 18. The CRC checker 18 checks whether the block address signal and the data at every block have errors or not and generates an error detection output EDT which takes a value "1" in the presence of the error and "0" in the absence of the error.

The RAM 16 stores therein the data contained in one block except the synchronizing signal and the block address signal (both are presented as SYNC in FIGS. 2A and 2B and so on) and is of a storage capacity of, for example, 8 blocks in consideration of jitter amount. This storage capacity of 8 blocks enables the correction of jitters up to ±2 blocks. The RAM 16 is supplied with an input data WDT', that is derived through the delay circuit 17, a write-in control pulse $\overline{WE}$ and an address through an address selector 19, and then produces an output data RDT. The address selector 19 is provided to select the write-in address or the read-out address and is switched at every predetermined interval. The write-in address and the read-out address are respectively formed of a bit address and a block address.

The write-in address is provided by a bit address counter 20 and a block address counter 21. A playback bit clock obtained from a clock extracting circuit (not shown) is supplied through a terminal 22 to the bit address counter 20. A playback sync pulse PSY' appearing at the output from a delay circuit 27 is supplied to a clear terminal CL of the address counter 20 and a load terminal LD of the address counter 21. A flip-flop circuit 28 to which the error detection output EDT from the CRC checker 18 is supplied at its input D is supplied at its enable terminal EN with the sync pulse PSY' and this flip-flop circuit 28 produces at its output Q the write-in control pulse $\overline{WE}$. An address generation ROM (read-only memory) 29 is further provided to generate a write-in block address WA which is then supplied to the block address counter 21 at its parallel input IN and loaded therein by the playback sync pulse PSY' applied thereto at its load terminal LD. The ROM 29 generates the predetermined block address WA on the basis of the playback block address BA contained in the reproduced and the lock mode signal from the flip-flop circuit 5. The read-out bit address is provided by such a manner that a bit address counter 23 is supplied with a reference bit clock through a terminal 25, while the read-out block address RA is produced in such a manner that a block address counter 24 is supplied with a reference block clock through a terminal 26. The read-out block address RA is supplied to the ROM 29 as mentioned before which then generates the write-in block address WA. Each of the address counters 23 and 24 is supplied at its clear terminal CL with a predetermined clear pulse.

An 8-bit error flag memory 30 is provided to which an incoming data is supplied from a multiplexer 31. When the CRC checker 18 identifies that the data or the block address signal of one block contains an error, the error detection signal EDT takes a value "1" by which the data of that block is inhibited from being written. In other words, since it is carried out that the correct data is written in the correct block address BA, the multiplexer 31 is controlled by the write-in control pulse $\overline{WE}$ such that "0" is supplied to the error flag memory 30 upon write-in operation, while in other operation, "1" is supplied thereto. The output from the error flag memory 30 is supplied to a latch 32 and the output from this latch 32 is delivered as an error flag EFLG. A controller 33 is provided which is supplied with the same address and write-in control pulse $\overline{WE}$ as those supplied to the RAM 16 whereby the error flag memory 30 is controlled in association with the operation of the RAM 16.

In the embodiment of this invention as mentioned above, there is utilized the 4-phase phase-locked loop (PLL) servo and the mode to which the reproduced data is locked at present is indicated by the lock mode signal, so that the ROM 29 is adapted to selectively change the tables shown in FIGS. 6A, 6B, 6C and 6D in response to each mode.

Since the servo reference signal and the read-out block address RA are, in a constant phase relation, the read-out block address RA sequentially changes from 0-address to 7-address as shown in FIG. 7A. If, now, the reproduced data is locked to the 0-th mode and contains no time base error, the reproduced control signal CTL becomes to have such a phase as shown in FIG. 7B. Then, the reproduced block address BA contained in the reproduced data WDT' varys sequentially so as to appear as [0] [1] [2] [3] as illustrated in FIG. 7C. The ROM 29 employs the conversion table shown in FIG. 6A and produces the write-in block address WA shown in FIG. 7D on the basis of the read-out block address RA and the reproduced block address BA which address WA is then loaded to the write-in block address counter 21. That is, the ROM 29 is controlled such that the write-in block address WA and the read-out block address RA may have therebetween a maximum difference (4 blocks). Thus, the TBC according to this embodiment is capable of correcting the errors up to ±2 blocks and the data is delayed by 4 blocks through the TBC.

When the reproduced data is locked to the first mode, the control signal CTL has the phase shown in FIG. 7E for the read-out block address RA of FIG. 7A and the reproduced block address BA becomes as shown in FIG. 7F. In this case, in accordance with the conversion table of FIG. 6B, the ROM 29 generates the write-in block address WA as shown in FIG. 7G.

The reproduced control signal CTL and the reproduced block address BA have a constant phase relation and this has nothing to do with the lock mode. But, if any positional displacement between the data track TD and the control track TC takes place due to the skew of the magnetic tape, the above phase relation is varied. For example, there may occur such a case that relative to the control signal CTL shown in FIG. 7E, the reproduced block address BA delayed by one block as shown in FIG. 7H is generated occasionally. Even in such case, the ROM 29 can generate the write-in block address WA shown in FIG. 7I on the basis of the conversion table shown in FIG. 6B. Of course, due to the existence of time base error, when the write-in-block address WA may sometimes advance or be delayed relative to the read-out block address RA, if the time base error is in the correctable range (±2 blocks), the read-out operation and the write-in operation are not overlapped.

The afore-said TBC will be described in more detail with reference to FIGS. 8A to 8G. When the reproduced data WDT shown in FIG. 8A is supplied from the delay circuit 15 to the CRC checker 18, this CRC checker 18 produces at the timing of the end of one block the error detection output EDT representing whether or not the block contains error shown in FIG. 8B. In FIG. 8A, of the reproduced data WDT, there are illustrated two blocks in which the block addresses BA as [1] and [2]. Accordingly, the error detection output EDT shown in FIG. 8B is concerned with the blocks of the preceding block addresses of [0] and [1], and when the block contains error, the error detection output EDT takes a value "1" as shown by broken lines in FIG. 8B. The playback sync pulse PSY shown in FIG. 8D is delivered from the delay circuit 15. The bit pattern of the sync signal SYNC is selected not to appear in the data and is discriminated from the data, and so the sync signal detection circuit 14 detects this bit pattern and then produces the sync pulse PSY. The sync pulse PSY is delayed by the delay circuit 27 so as to have the timing substantially coincident with that of the error detection output EDT and thereby produced from the delay circuit 27 as a sync pulse PSY' shown in FIG. 8E.

The bit address counter 20 is cleared up by this sync pulse PSY' and the write-in block address WA from the ROM 29 is loaded in the block address counter 21 by the sync pulse PSY'. If as mentioned before, the reproduced data is locked to the 0-th mode and contains therein no jitter, in response to the block address BA of the reproduced data WDT' being varied to [0] and [1], the write-in block address WA is varied into 4 and 5, respectively. In addition, since the sync pulse PSY' is applied to the enable terminal EN of the flip-flop circuit 28, the write-in control pulse $\overline{WE}$ therefrom is changed as shown in FIG. 8G. The data is delayed by the delay circuit 17 such that the data is supplied to the RAM 16 after the error detection for that block was carried out. If the error detection output EDT is at "1", the data of that block is inhibited from being written.

The error flag memory 30 stores therein the output from the multiplexer 31 which the output becomes at "0" when the RAM 16 is in the write-in operation mode and at "1" in other mode. This error flag memory 30 is a memory of 8 bits having 8 addresses from 0 to 7 which are made coincident with the block address of the RAM 16 by supplying the write-in block address WA appearing at the output from the block address counter 21 to the controller 33. The error flag memory 30 is adapted to perform the write-in operation after it is confirmed that the write-in bit address of the RAM 16 takes the maximum value. The reason for this is that when an incorrect sync pulse due to the influence of noise and so on is reproduced as the reproduced sync pulse PSY and the block address is changed before all the data of one block are written in the RAM 16, the "0" is inhibited from being written in the error flag memory 30.

The reading of the error flag memory 30 is started from the address that is coincident with the read-out block address RA from the counter 24. The read-out bit address is used to control the read-out timing of the memory 30 and the latch timing of the latch 32. By way of example, the timing is controlled such that after one bit of the predetermined address of the specified block is read out from the beginning thereof, the latch operation is performed, thus the error flag EFLG being produced from the latch 32. The read-out data RDT from the RAM 16 and the error flag EFLG are synchronized with each other and so, in the encoder of the next stage, the error correction is performed by using the error flag EFLG. In the read-out operation of such error flag memory 30, the output from the memory 30 is latched in the latch 32 and at the same time, "1" is at all times written in the present address (which is coincident with the read-out block address RA). This is because the data containing error is inhibited from being written in the RAM 16 so that when the previously written data is read out again from the RAM 16, a misoperation by which this data is processed as a correct data is avoided.

According to this embodiment of the present invention, the parity word is used as the error correction code and one word error in one code block can be corrected by the mod.2 addition of other PCM words and the parity word, requiring no error word for error correction.

As will be understood from the description of the afore-said embodiment, according to this invention, since the polyphase PLL servo is employed, even when there exist plurality of relations between the reference signal and the reproduced data, it is possible to realize the TBC capable of preventing the correction range from being narrowed. Moreover, according to this invention, the delay amount of the TBC itself can be prevented from being varied by the lock mode so that in the case of sync-recording, no disadvantage will take place.

Unlike the above-mentioned embodiment of the present invention in which the error flag memory 30 is provided separate from the RAM 16 for data, the data and the error flag may be stored in a common memory.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

We claim as our invention:

1. A time base correcting apparatus for correcting time base errors in a digital signal supplied thereto in the form of successive data blocks, each data block including at least plural data words and a block address circulating with a predetermined phase relation to a reference signal, said apparatus being characterized by:

memory means having plural addressable storage locations, each storing a respective data block;

write address generating means responsive to said block address for generating write-in addresses to identify particular storage locations into which the supplied data blocks are written;

write-in means for writing successive data blocks into those storage locations identified by said write address generating means;

read address generating means for generating read-our addresses to identify particular storage locations from which a stored data block is read out;

read-out means for reading out the contents of a storage location identified by said read address generating means; and means contained in said write address generating means for varying said write-in address by a lock mode signal, said lock mode signal representing a phase relation at which said incoming digital signal is locked.

2. The apparatus of claim 1, wherein said write address generating means includes means for generating a write-in address with a function of said block address and the read-out address generated.

3. The apparatus of claim 1 further comprising:
a first transducer for reproducing said digital signal from a recording medium;
a second transducer for reproducing a control signal, said control signal being recorded on said recording medium at every plural data block interval;
servo means for controlling transportation of said recording medium to be locked to a predetermined phase relative to the reference signal by said reproduced control signal and generating this lock signal; and
means for supplying said generated lock signal to said varying means.

4. The apparatus of claim 3 further comprising:
a counter supplied with a clock signal with a constant frequency and producing a signal of which the value varies periodically;
phase comparing means for sample-holding an output signal from said counter by said control signal;
means for supplying part of the output derived from said phase comparing means to said servo means; and
means for supplying part of the output derived from said phase comparing means to said varying means as said lock signal.

5. The apparatus of claim 1, wherein said write address generating means is comprised of a read-only memory having a conversion table and said varying means selectively changes said conversion table.

* * * * *